(12) United States Patent
Han et al.

(10) Patent No.: US 6,452,092 B2
(45) Date of Patent: Sep. 17, 2002

(54) PHOTOVOLTAIC CELL AND SOLAR CELL UTILIZING THE SAME

(75) Inventors: Liyuan Han, Kitakatsuragi-gun; Ryosuke Yamanaka, Gojo, both of (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/764,411

(22) Filed: Jan. 19, 2001

(30) Foreign Application Priority Data

Jan. 19, 2000 (JP) .......................... 2000-010451

(51) Int. Cl.[7] .................. H01L 31/04; H01M 14/00
(52) U.S. Cl. ............... 136/263; 136/256; 136/252; 136/250; 429/111; 257/40; 257/43; 257/431
(58) Field of Search .................. 136/263, 256, 136/252, 250; 429/111; 257/40, 43, 431

(56) References Cited

U.S. PATENT DOCUMENTS 5,482,570 A * 1/1996 Saurer et al. ............... 136/255
5,885,368 A * 3/1999 Lupo et al. ............... 136/263
6,150,605 A * 11/2000 Han ............... 136/263
6,291,763 B1 * 9/2001 Nakamura ............... 136/256

FOREIGN PATENT DOCUMENTS

| EP | 901175 A2 * | 3/1999 |
| JP | 2664194 B2 | 6/1997 |
| WO | WO91/16719 | 10/1991 |

OTHER PUBLICATIONS

Hagen et al, "Novel hybrid solar cells consisting of inorganic nanoparticles and an organic hole transport material," Synthetic Metals, 89, pp. 215–220, 1997.*

Murakoshi et al, "Solid State Dye–Sensitized Solar Cell with Polypyrrole as Hole Transport Layer," Chemistry Letters, pp. 471–472, 1997.*

* cited by examiner

Primary Examiner—Alan Diamond
(74) Attorney, Agent, or Firm—Nixon & Vanderhye P.C.

(57) ABSTRACT

A photovoltaic cell comprises an electrode layer, a photovoltaic layer, a hole transport layer, a conductive layer and a counter electrode layer stacked in this order.

31 Claims, 2 Drawing Sheets

PHOTOVOLTAIC CELL AND SOLAR CELL UTILIZING THE SAME

CROSS-REFERENCE TO RELATED APPLICATION

This application is related to Japanese application No.2000-010451 filed on Jan. 19, 2000, whose priority is claimed under 35 USC § 119, the disclosure of which is incorporated by reference in its entirety.

BACKGROUND OF THE INVENTION

1. Field of the Invention

The present invention relates to a photovoltaic cell and a solar cell utilizing the photovoltaic cell.

2. Description of Related Art

Solar cells utilizing sunbeam have drawn attention as an alternative energy source to fossil fuels and various researches have been carried out. At present, solar cells made of polycrystalline silicon or amorphous silicon have been practically used as the mainstream. However, they are problematic in high costs and large energy consumption in manufacturing them and in the use of highly toxic materials such as gallium and arsenic.

According to Japanese Patent Kohyo No. HEI 5(1993)-504023, which corresponds to International Publication WO91/16719, published Japanese Patent No. 2664194 and International Publication WO94/05025, a wet type solar cell utilizing photoinduced electron transfer of a metallic complex has been disclosed as a novel solar cell.

The wet type solar cell is constructed of a semiconductor electrode, a counter electrode and an electrolyte layer sandwiched by the electrodes. Onto a surface of the semiconductor electrode which serves as a photoelectric conversion material, a photosensiting dye having an absorption spectrum in the range of visible rays is adsorbed.

Where the semiconductor electrode is irradiated with light, electrons are generated in the semiconductor electrode and transferred to the counter electrode through an electric circuit. The transferred electrons are carried by ions in the electrolyte layer and return to the semiconductor electrode. These steps are repeated to generate electric power.

However, in the wet type solar cell, electrical connection between the semiconductor electrode and the counter electrode is established by an electrolyte solution. Accordingly, leakage of the solution may possibly be occur, which brings unsatisfactory stability in the long term and complication of the manufacturing steps.

Regarding these drawbacks, Japanese Unexamined Patent Publication HEI 9(1997)-27352 has proposed the use of a solid electrolyte in the gel form. Further, Japanese Unexamined Patent Publication HEI 11(1999)-144773 has disclosed the use of an organic hole transport material in place of the electrolyte.

However, the solid electrolyte in the gel form also contains the organic solution so that the solution leakage cannot be avoided. Further, when using hole transport materials such as triphenylamine, the conversion efficiency is extremely low, because these materials show poor hole transport mobility and it is difficult to transfer the hole from dye to counter electrode without bias.

In view of the above, an object of the present invention is to provide a photovoltaic cell with great stability and high conversion efficiency, as well as a solar cell utilizing the photovoltaic cell.

SUMMARY OF THE INVENTION

According to the present invention, provided is a photovoltaic cell comprising an electrode layer, a photovoltaic layer, a hole transport layer, a conductive layer and a counter electrode layer stacked in this order.

Still according to the present invention, provided is a solar cell comprising the above-mentioned photovoltaic cell.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
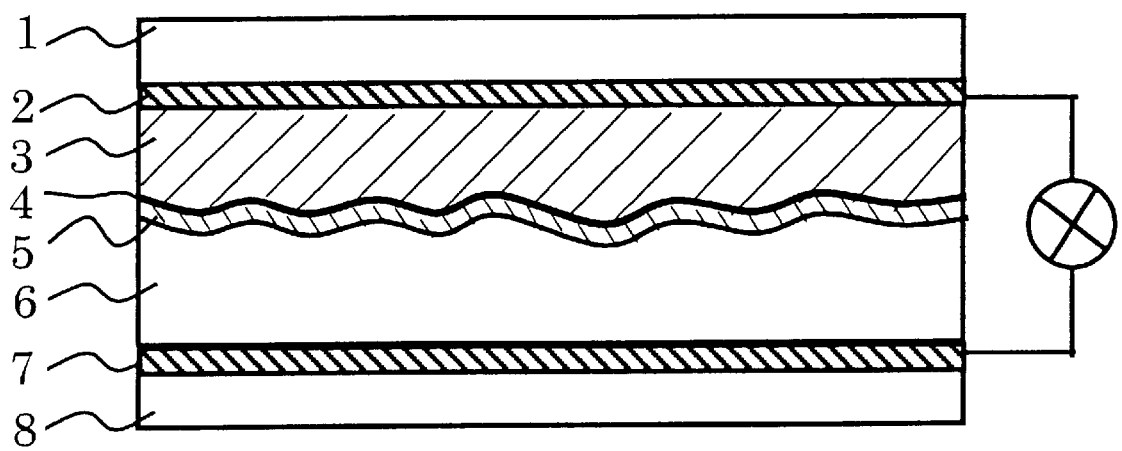
FIG. 1 is a schematic view illustrating a solar cell utilizing a photovoltaic cell according to the present invention.
Figure 2:
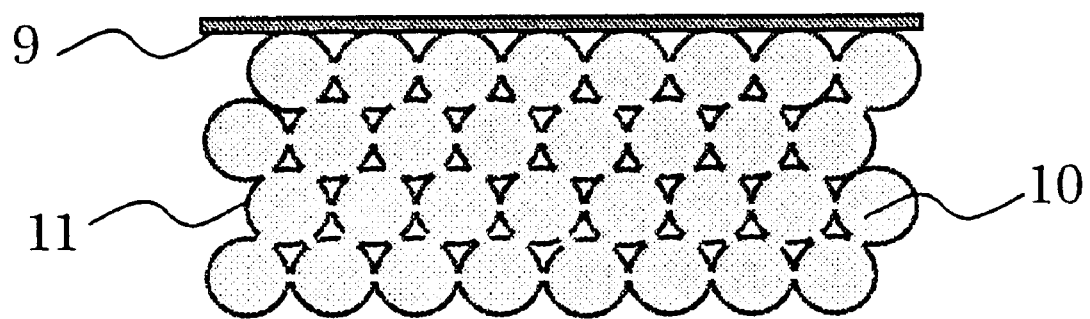
FIG. 2 is a schematic view illustrating a photovoltaic layer shown in FIG. 1.

The photovoltaic cell according to the present invention comprises an electrode layer, a photovoltaic layer, a hole transport layer, a conductive layer and a counter electrode layer stacked in this order.

There is no particular limitation to the electrode layer and the counter electrode layer of the present invention as long as they are commonly used as electrodes, but for example, they may be formed by vapor-depositing any one of gold, silver, aluminum, indium, indium tin oxide (an ITO film) and tin oxide onto a metal substrate, a glass substrate or a substrate of a transparent plastic sheet. One or both of the electrode layer and the counter electrode layer may preferably be transparent.

The photovoltaic layer of the present invention is not particularly limited as long as it is commonly used as a photoelectric conversion material, but for example, it may be an inorganic or an organic semiconductor material.

Examples of the inorganic semiconductor material include known substances such as titanium oxide, zinc oxide, tungsten oxide, barium titanate, strontium titanate, cadmium sulfide and the like. Among them, it is preferred to use titanium oxide in view of stability and safety. Titanium oxide referred to in the present invention signifies various kinds of titanium oxide including anatase titanium oxide, rutile titanium oxide, amorphous titanium oxide, methatitanium oxide and orthotitanium oxide, as well as titanium hydroxide and hydrous titanium oxide.

These inorganic semiconductor materials may solely be used, or two or more kinds of them may be combined.

Examples of the organic semiconductor material include porphine derivatives, phthalocyanine derivatives and cyanine derivatives, for example.

In order to increase conversion efficiency of the photovoltaic cell, a dye is preferably adsorbed in a surface of the semiconductor material as an agent for enhancing spectrum sensitivity (a photosensiting dye). In particular, where the inorganic semiconductor material such as metal oxide is used, the photosensiting dye is preferably adsorbed into the inorganic semiconductor material for enhancing sensitivity to light.

Examples of the photosensiting dye include various substances having an absorption spectrum in the range of visible rays and/or infrared rays, e.g., ruthenium bipyridine dyes, azoic dyes, quinone dyes, quinoneimine dyes, quinacridone dyes, squarylium dyes, cyanine dyes, merocyanine dyes, triphenylmethane dyes, xanthene dyes, porphyrin dyes, phthalocyanine dyes, perylene dyes, indigo dyes, naphthalocyanine dyes and the like.

Further, may also be used are metal complex dyes utilizing metals such as Cu, Ni, Fe, Co, V, Sn, Si, Ti, Ge, Cr, Zn, Ru, Mg, Al, Pb, Mn, In, Mo, Y, Zr, Nb, Sb, La, W, Pt, Ta, Ir, Pd, Os, Ga, Tb, Eu, Rb, Bi, Se, As, Sc, Ag, Cd, Hf, Re, Au, Ac, Tc, Te, Rh and the like.

Among the above photosensiting dyes, those having an interlock group such as a carboxyl group, an alkoxy group, a hydroxyl group, a sulfonic acid group, an ester group, a mercapto group, a phosphonyl group and the like are preferably used so that the dye is surely adsorbed into the semiconductor.

The semiconductor material may preferably be in the form of a porous film having a large specific surface area so that it can adsorb the dye of larger amount. The specific surface area of the porous semiconductor material film is preferably 10 $m^2/g$ or more, for example.

The thickness of the semiconductor material is not limited, but preferably about 0.3 to 50 $\mu m$.

The hole transport layer of the present invention is mainly a P-type semiconductor through which injected holes are transferred.

The hole transport layer of the present invention may be formed of an inorganic or an organic hole transport material, for example.

The inorganic hole transport material may be CuI, CuO, NiO and the like.

The organic hole transport material includes polymeric materials and molecular materials. Examples of the polymeric hole transport material include polyvinyl carbazole, polyamine, organic polysilane and the like. Examples of the molecular hole transport material include triphenylamine derivatives, stilbene derivatives, hydrazone derivatives, phenamine derivatives and the like. Among these, organic polysilane is preferable since it is, different from other carbon polymers, a polymer having a Si main chain and $\sigma$ electrons delocalized along the main chain contribute to the photoconduction, so that high hole mobility is exhibited (Phys. Rev. B, 35, 2818 (1987)). The organic polysilane is applicable to provide a photovoltaic cell having high conversion efficiency since it is colorless and transparent and $\sigma$ electrons are conjugated.

The organic polysilane to be used may be a commercially available product in the shape of pellets or powders, or it may be synthesized. The organic polysilane may preferably be soluble in an organic solvent and have a molecular weight sufficient to form a film. In general, organic polysilane having a weight-average molecular weight of 1,000 to 20,000 is preferable.

Examples of organic polysilane include, for example, polymethyl phenylsilane, polyethyl phenylsilane, polydihexylsilane, polymethyl cyclohexylsilane, polydicyclohexylsilane and the like.

The hole transport layer is preferably thin so that holes injected from the photosensiting dye are efficiently passed through. For example, the thickness thereof is preferably 0.5 $\mu m$ or less, more preferably 0.01 to 0.1 $\mu m$.

The conductive layer of the present invention is not particularly limited as long as it is highly conductive, but may be formed of an inorganic conductive material, an organic conductive material, a conductive polymer, an intermolecular charge-transfer complex and the like. Among them, the intermolecular charge-transfer complex is preferable.

The intermolecular charge-transfer complex is comprised of a donor material and an acceptor material. It may preferably be constructed of a molecular substance so that it can easily be permeated in the porous photovoltaic layer mentioned above. An organic donor and an organic acceptor are more preferable since they are highly soluble in the organic solvent and have low melting points and thus can easily be processed by casting or melting.

The donor material is preferably rich in electrons in a molecular structure thereof. For example, the organic donor material may be a substance having a substituted or non-substituted amine group, a hydroxide group, an ether group, a selen atom or a sulfur atom in conjugated $\pi$ electrons of its molecule. More specifically, phenylamines, triphenylmethanes, carbazoles, phenols and tetrathiafulvalenes are used.

The acceptor material is preferably poor in electrons in a molecular structure thereof. For example, the organic acceptor material may be a substance having a substituted group such as a nitro group, a cyano group, a carboxyl group or a halogen group in conjugated $\pi$ electrons of its molecule. More specifically, quinones such as benzoquinones, naphthoquinones and the like, fluorenones, chloranils, bromanils, tetracyanoquinodimethanes, tetracyanoneethylenes and the like are used.

The thickness of the conductive layer is not particularly limited, but a thickness with which the pores of the photovoltaic layer are entirely filled is preferable.

As mentioned above, the photovoltaic cell of the present invention comprises the electrode layer, the photovoltaic layer, the hole transport layer, the conductive layer and the counter electrode layer stacked in sequence. Since no electrolyte solution is used, solution leakage is avoided and thus the photovoltaic cell exhibits long-term stability.

Further, making use of its characteristics, the photovoltaic cell of the present invention is suitably applied to photoelectric conversion solar cells, photoswitching devices, sensors and the like.

With respect to a method of forming the photovoltaic layer, it is performed by providing the inorganic or the organic semiconductor on the electrode layer according to various known methods. More specifically, it is formed by applying a suspension containing semiconductor particles onto the electrode layer and then drying and/or baking the suspension. Alternatively, it is formed by CVD or MOCVD utilizing a desired material gas, PVD, vapor deposition or sputtering with use of a solid material, or a sol-gel method.

As the semiconductor particles, may be used are commercially available particles of a single substance or a compound semiconductor material having an average particle diameter of 1 to 2000 nm. Such semiconductor particles are used in a suspended form in a suitable solvent.

Examples of the suitable solvent include glyme solvents such as ethyleneglycol monoethyl ether, alcohols such as isopropylalcohol, solvent mixtures such as of isopropyl alcohol/toluene, water and the like.

Where the method of drying and/or baking is employed, atmosphere, temperature and time required for the step of drying and/or baking are suitably adjusted depending on the kinds of substrate, solvent and semiconductor particles to be used. For example, it is performed under atmospheric pressure or inert gas atmosphere at about 50 to 800° C. for about 10 seconds to 12 hours. The step of drying and/or baking may be performed once at a certain temperature or twice or more while varying the temperature.

Where CVD or MOCVD is employed, a single material gas or a mixture of two or more gases containing an element for forming the semiconductor is used as the material gas.

Where PVD or the like is used, a single solid material, a combination of plural solid materials or a solid compound containing an element for forming the semiconductor is used.

In order to make the photosensing dye adsorbed in the inorganic semiconductor, for example, the semiconductor is immersed into a solution containing the photosensing dye.

The solvent used in the above-mentioned solution is not particularly limited as long as it dissolves the photosensing dye, for example, an organic solvent such as alcohol, toluene, acetonitrile, chloroform, dimethylformamide and the like. The solvent is preferably purified.

The concentration of the photosensing dye in the solution is suitably adjusted depending on the kinds of dye and solvent to be used and conditions for the dye adsorption. For example, the concentration may preferably be no less than $1 \times 10^{-5}$ mol/liter, more preferably about 1 to $9 \times 10^{-4}$ mol/liter.

Where the inorganic semiconductor is immersed into the solution containing the photosensing dye, temperature, pressure and an immersing period are suitably adjusted. The immersing may be performed once or plural times. The semiconductor may suitably be dried after the immersing.

The photosensing dye adsorbed in the inorganic semiconductor by the above-mentioned method functions as a photosensing agent which transmits electrons through energy of light.

In general, the photosensing dye is fixed to the semiconductor via an interlock group. The interlock group provides electrical connection which facilitates electron transfer between the excited dye and a conduction band of the semiconductor. The interlock group may be a carboxyl group, a hydroxyalkyl group, a hydroxyl group, a sulfonic acid group, an ester group, a mercapto group and a phosphonyl group, as described above.

In the present invention, the surface of the semiconductor may be activated before the photosensing dye is adsorbed therein.

With respect to a method of forming the hole transport layer, it may be performed by preparing a hole transport material solution by dissolving the hole transport material into an organic solvent such as toluene, xylene, dioxane or the like and applying the thus prepared solution onto the photovoltaic layer in which the photosensing dye has been adsorbed. In this case, the concentration of the hole transport material solution may preferably be low, for example, 0.1 to 20%, more preferably 0.1 to 5% so that a thin conductive layer is provided. Further, it is preferred to apply the solution under reduced pressure so that the hole transport material smoothly permeates into the porous photovoltaic layer.

Where a molecular hole transport material is used, a polymer binder such as polycarbonate, polyester or the like is preferably added to form a uniform film. Addition amount of the polymer binder is preferably 1 to 50 wt % with respect to the hole transport material.

The conductive layer may be formed by applying a solution containing a material of the conductive layer onto the thus formed hole transport layer. Alternatively, it may be formed by placing the material of the conductive layer on the hole transport layer and heating to melt.

For example, where an intermolecular charge-transfer complex is used as the conductive layer material, a donor and an acceptor are dissolved in solvents, respectively, and the resulting solutions are mixed to prepare the intermolecular charge-transfer complex, and then it is applied onto the hole transport layer. Alternatively, the donor and the acceptor are mixed and placed on the hole transport layer and then heated to melt so that it sufficiently permeates into the porous photovoltaic layer. In this step, the molar ratio between the donor and the acceptor is preferably 1:99 to 99:1, more preferably 1:9 to 9:1. For sufficient permeation of the intermolecular charge-transfer complex into the porous photovoltaic layer, the solution mixture of the donor and the acceptor is preferably applied repetitively or applied under reduced pressure.

Thus, the photovoltaic element of the present invention comprising an electrode layer 2, a photovoltaic layer 3, a hole transport layer 5, a conductive layer 6 and a counter electrode layer 7 stacked in this order is provided.

The photovoltaic cell of the present invention is formed on a support body 1 of a glass substrate coated with a conductive film, and a support body 8 of a glass substrate is formed on the photovoltaic cell. Thus, a solar cell is provided (FIG. 1).

EXAMPLES

Hereinafter, the photovoltaic cell of the present invention is explained in Examples described below, but the present invention is not limited thereto.

Example 1

Commercially available titanium oxide particles (manufactured by TAYCA CORPORATION, average particle diameter of 30 nm) of 4.0 g and diethyleneglycol monomethyl ether of 20 ml were dispersed with a paint shaker using hard glass beads for 6 hours to prepare a titanium oxide suspension. With a doctor blade, the titanium oxide suspension was applied to a glass plate to which a tin oxide conductive layer had been applied (an electrode layer) and pre-drying was performed at 100° C. for 30 minutes. Then, it was sintered in an electric oven at 500° C. for 40 minutes to form a titanium oxide film (a semiconductor material) on the glass plate.

Separately, a photosensing dye represented by the chemical formula 1 was dissolved in ethanol to obtain a solution of the photosensing dye.

[Chemical formula 1]

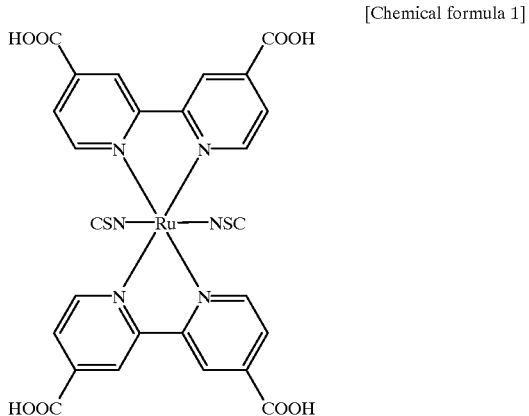

The concentration of the photosensiting dye solution was $5 \times 10^{-4}$ mol/liter. Then, the glass plate on which the titanium oxide film had been formed was placed in the dye solution at 60° C. for 60 minutes so that the dye was adsorbed into the glass plate. The glass plate was then dried to form a photovoltaic layer comprising the semiconductor material and the photosensiting dye on the glass plate (sample A).

On the photovoltaic layer of sample A, a solution of polyvinyl carbazole (weight-average molecular weight of 3,000) in toluene (1%) which acts as a hole transport material was applied and dried under reduced pressure. Thus, a hole transport layer was formed (sample B).

Ethylcarbazole of 1.95 g and 5-nitronaphthoquinone of 2.03 g were dissolved in acetone of 100 ml to prepare an intermolecular charge-transfer complex and the resulting solution was repetitively applied onto the hole transport layer of sample B to form a conductive layer. Then, a gold electrode (a counter electrode) was vapor-deposited on the conductive layer to complete a photovoltaic cell (sample C).

The photovoltaic cell (sample C) obtained was irradiated with light having an intensity of 1000 W/m$^2$(AM1.5 solar simulator) and the resultant conversion efficiency was 2.0%. This shows that the photovoltaic cell is useful as a solar cell.

Example 2

A solution of phenylmethyl polysilane (weight-average molecular weight of 110,000) in toluene (1%) was applied to the photovoltaic layer of sample A and dried under reduced pressure to form a hole transport layer (sample D).

Ethyl carbazole of 0.195 g and 5-nitronaphthoquinone of 0.203 g were mixed and placed on the hole transport layer of sample D. A glass plate on which a tin oxide conductive layer had been formed was placed thereon. Then, it was heated at 120° C. and maintained for about 10 minutes to obtain a photovoltaic cell (sample E).

The photovoltaic cell (sample E) obtained was irradiated with light having an intensity of 1000 W/m$^2$(AM1.5 solar simulator) and the resultant conversion efficiency was 2.4%. This shows that the photovoltaic cell is useful as a solar cell.

Example 3

A photovoltaic cell (sample F) was obtained in the same manner as in Example 1 except that ethyl carbazole of 0.195 g and 7,7,8,8,-tetracyanonequinodimethane (TCNQ) of 2.04 g were used to prepare the intermolecular charge-transfer complex. With the solar simulator, the thus obtained photovoltaic cell (sample F) was irradiated with light of 100 W/M$^2$ and the conversion efficiency of 2.6% was obtained.

Example 4

A photovoltaic cell (sample G) was obtained in the same manner as in Example 1 except that a substance represented by the chemical formula 2 was used as the hole transport material.

The photovoltaic cell (sample G) obtained was irradiated with light having an intensity of 1000 W/m$^2$(AM1.5 solar simulator) and the resultant conversion efficiency was 2.3%. This shows that the photovoltaic cell is useful as a solar cell.

[Chemical formula 2]

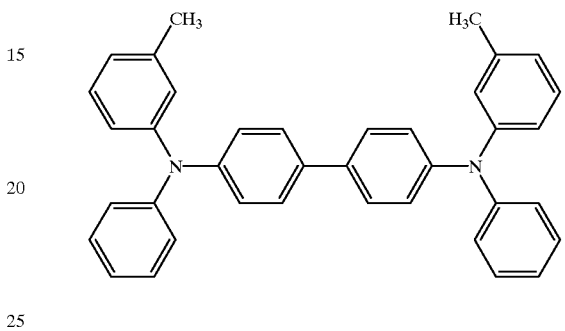

Example 5

A photovoltaic cell (sample H) was obtained in the same manner as in Example 1 except that a substance represented by the chemical formula 2 and polycarbonate (molar ratio= 1:1) were used to prepare the hole transport material.

The photovoltaic cell (sample H) obtained was irradiated with light having an intensity of 1000 W/m$^2$(AM1.5 solar simulator) and the resultant conversion efficiency was 2.5%. This shows that the photovoltaic cell is useful as a solar cell.

Example 6

A photovoltaic cell (sample I) was obtained in the same manner as in Example 4 except that a substance represented by the chemical formula 2 and iodine were used to form the conductive layer.

The photovoltaic cell (sample I) obtained was irradiated with light having an intensity of 1000 W/m$^2$(AM1.5 solar simulator) and the resultant conversion efficiency was 2.6%. This shows that the photovoltaic cell is useful as a solar cell.

Example 7

1,4,5,8-tetraaminoantraquinone of 2.7 g and 7,7,8,8-tetracyanoquinodimethane [(2,5-cyclohexadiene-1,4-diylidene)dimalononitrile: TCNQ] of 2.04 g were put in ethanol of 200 ml to prepare an intermolecular charge-transfer complex and then ethanol was evaporated out to obtain a powder of the intermolecular charge-transfer complex. The powder was placed on the hole transport layer of sample B and pressed to fill the porous photovoltaic layer. A gold electrode (a counter electrode) was vapor-deposited thereon to complete a photovoltaic cell (sample J).

The photovoltaic cell (sample J) obtained was irradiated with light having an intensity of 1000 W/m$^2$(AM1.5 solar simulator) and the resultant conversion efficiency was 2.8%. This shows that the photovoltaic cell is useful as a solar cell.

The photovoltaic cell of the present invention is comprised of the electrode layer, the photovoltaic layer, the hole transport layer, the conductive layer and the counter electrode layer stacked in this order, so that its mechanical strength is excellent. Further, liquid leakage does not occur since no electrolyte solution is used, so that the photovoltaic cell exhibits favorable long-term stability and reliability.

Since the hole transport layer and the conductive layer are provided, the thickness of the hole transport layer is reduced. Further, holes injected from the photosensiting dye easily reach the counter electrode, which achieves high energy conversion efficiency. Moreover, the photovoltaic cell of the present invention is readily manufactured with less manufacture costs because all the materials used are solid s ubstances.

What is claimed is:

1. A photovoltaic cell comprising an electrode layer, a photovoltaic layer, a hole transport layer, a conductive layer and a counter electrode layer stacked in this order, wherein the photovoltaic layer is made of a porous material, and the porous photovoltaic layer and the hole transport layer are embedded in at least a portion of the conductive layer.

2. A photovoltaic cell according to claim 1, wherein one or both of the electrode layer and the counter electrode layer is/are transparent.

3. A photovoltaic cell according to claim 1, wherein the photovoltaic layer is comprised of a semiconductor material and a photosensiting dye adsorbed therein.

4. A photovoltaic cell according to claim 3, wherein the semiconductor material is an inorganic semiconductor material.

5. A photovoltaic cell according to claim 3, wherein the photosensiting dye has an interlock group selected from a carboxyl group, an alkoxy group, a hydroxyl group, a sulfonic acid group, an ester group, a mercapto group, and a phosphonyl group.

6. A photovoltaic cell according to claim 3, wherein the semiconductor material is a porous material.

7. A photovoltaic cell according to claim 6, wherein the porous material has a specific surface area of 10 $m^2/g$ or more.

8. A photovoltaic cell according to claim 3, wherein the semiconductor material is titanium oxide.

9. A photovoltaic cell according to claim 3, wherein the semiconductor material has a thickness of 0.3 to 50 $\mu$m.

10. A photovoltaic cell according to claim 1, wherein the conductive layer is comprised of an intermolecular charge-transfer complex.

11. A photovoltaic cell according to claim 10, wherein the intermolecular charge-transfer complex is comprised of an organic donor and an organic acceptor.

12. A photovoltaic cell according to claim 10, wherein the intermolecular charge-transfer complex is comprised of a carbazole donor and a quinone acceptor.

13. A photovoltaic cell according to claim 1, wherein the hole transport layer has a thickness of 0.5 $\mu$m or less.

14. A photovoltaic cell according to claim 1, wherein the hole transport layer is comprised of an organic high polymeric hole transport material.

15. A photovoltaic cell according to claim 14, wherein the organic high polymeric hole transport material is organic polysilane.

16. A photovoltaic cell according to claim 15, wherein the organic polysilane has a weight-average molecular weight of 1,000 to 20,000.

17. A solar cell comprised of a photovoltaic cell according to claim 1.

18. A photovoltaic cell comprising an electrode layer, a photovoltaic layer, a hole transport layer, a conductive layer and a counter electrode layer stacked in this order wherein the conductive layer is comprised of an intermolecular charge-transfer complex which is comprised of a carbozole donor and a quinone acceptor.

19. A photovoltaic cell according to claim 18, wherein one or both of the electrode layer and the counter electrode layer is/are transparent.

20. A photovoltaic cell according to claim 18, wherein the photovoltaic layer is comprised of a semiconductor material and a photosensiting dye adsorbed therein.

21. A photovoltaic cell according to claim 20, wherein the semiconductor material is an inorganic semiconductor material.

22. A photovoltaic cell according to claim 20, wherein the photosensiting dye has an interlock group selected from a carboxyl group, an alkoxy group, a hydroxyl group, a sulfonic acid group, an ester group, a mercapto group, and a phosphonyl group.

23. A photovoltaic cell according to claim 20, wherein the semiconductor material is a porous material.

24. A photovoltaic cell according to claim 23, wherein the porous material has a specific surface area of 10 $m^2/g$ or more.

25. A photovoltaic cell according to claim 20, wherein the semiconductor material is titanium oxide.

26. A photovoltaic cell according to claim 20, wherein the semiconductor material has a thickness of 0.3 to 50 $\mu$m.

27. A photovoltaic cell according to claim 18, wherein the hole transport layer has a thickness of 0.5 $\mu$m or less.

28. A photovoltaic cell according to claim 18, wherein the hole transport layer is comprised of an organic high polymeric hole transport material.

29. A photovoltaic cell according to claim 28, wherein the organic high polymeric hole transport material is organic polysilane.

30. A photovoltaic cell according to claim 29, wherein the organic polysilane has a weight-average molecular weight of 1,000 to 20,000.

31. A solar cell comprised of a photovoltaic cell according to claim 18.

* * * * *